US009575579B2

(12) United States Patent
Ashcraft et al.

(10) Patent No.: US 9,575,579 B2
(45) Date of Patent: *Feb. 21, 2017

(54) ATTACHING A STYLUS

(71) Applicant: HEWLETT-PACKARD DEVELOPMENT COMPANY, L.P., Houston, TX (US)

(72) Inventors: Britt C. Ashcraft, Tomball, TX (US); Ki Bok Song, Katy, TX (US); Eric Chen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,230

(22) Filed: Jan. 28, 2016

(65) Prior Publication Data

US 2016/0147316 A1 May 26, 2016

Related U.S. Application Data

(63) Continuation of application No. 13/560,803, filed on Jul. 27, 2012, now Pat. No. 9,268,379.

(51) Int. Cl.
*G06F 1/26* (2006.01)
*G06F 3/039* (2013.01)
*G06F 3/0354* (2013.01)
*H02J 5/00* (2016.01)

(52) U.S. Cl.
CPC .............. *G06F 3/039* (2013.01); *G06F 1/26* (2013.01); *G06F 3/03545* (2013.01); *G06F 2200/1632* (2013.01); *H02J 5/005* (2013.01)

(58) Field of Classification Search
CPC .............. H02J 5/005; G06F 2200/1632; G06F 3/03545; G06F 1/26–1/3296
See application file for complete search history.

(56) References Cited

U.S. PATENT DOCUMENTS

| 5,067,573 A | 11/1991 | Uchida | |
| 5,138,118 A * | 8/1992 | Russell | G06F 3/046 178/19.03 |
| 5,239,489 A * | 8/1993 | Russell | G06F 3/046 178/18.07 |

(Continued)

FOREIGN PATENT DOCUMENTS

KR 20080011520 2/2008

OTHER PUBLICATIONS

Belkin International, Inc., "Stylus + 30-Pin Holder for iPad", 2011, 1 page.

(Continued)

*Primary Examiner* — Zachary M Pape
*Assistant Examiner* — Douglas Burtner
(74) *Attorney, Agent, or Firm* — Trop, Pruner & Hu, P.C.

(57) ABSTRACT

In some examples, a stylus holder comprises a connector to attach to a port of a computing device and create an electrical connection to the computing device port, and a fastener to attach a stylus to the holder and provide at least one of a data and power connection to the stylus. The fastener includes a first inductive element formed in an internal cavity area of the fastener, the first inductive element to inductive couple to a second inductive element of the stylus, the second inductive element longer than the first inductive element.

20 Claims, 4 Drawing Sheets

(56) References Cited

U.S. PATENT DOCUMENTS

| | | | |
|---|---|---|---|
| 5,627,349 A | 5/1997 | Shetye | |
| 5,973,677 A * | 10/1999 | Gibbons | G06F 1/1626 178/18.04 |
| 6,266,685 B1 * | 7/2001 | Danielson | G06F 1/1626 361/679.4 |
| 6,450,721 B1 | 9/2002 | D'Amico et al. | |
| 7,053,883 B1 | 5/2006 | Kwok et al. | |
| 7,388,685 B2 | 6/2008 | Kia | |
| 8,243,049 B2 * | 8/2012 | Vos | G06F 3/03545 178/18.01 |
| 8,907,618 B2 * | 12/2014 | Komiyama | H01M 10/441 320/108 |
| 8,947,379 B2 * | 2/2015 | Bakken | G06F 3/03545 178/19.01 |
| 9,424,048 B2 * | 8/2016 | Jakoboski | G06F 1/266 |
| 2003/0061687 A1 * | 4/2003 | Hansen | B01L 3/502738 23/295 R |
| 2003/0210223 A1 | 11/2003 | Park | |
| 2005/0017958 A1 | 1/2005 | Silverbrook | |
| 2005/0033544 A1 | 2/2005 | Brooks | |
| 2005/0162411 A1 * | 7/2005 | Berkel van | G06F 3/03545 345/179 |
| 2006/0066568 A1 * | 3/2006 | Cheah | G06F 1/3215 345/156 |
| 2008/0284745 A1 | 11/2008 | Kao et al. | |
| 2009/0102794 A1 * | 4/2009 | Lapstun | G06F 3/03545 345/166 |
| 2010/0021022 A1 | 1/2010 | Pittel et al. | |
| 2011/0234623 A1 | 9/2011 | Ure | |
| 2011/0279081 A1 * | 11/2011 | Cacioppo | G06F 3/03545 320/108 |
| 2012/0068964 A1 * | 3/2012 | Wright | G06F 3/03545 345/174 |
| 2012/0086391 A1 * | 4/2012 | Smith | H02J 7/0044 320/107 |
| 2013/0106723 A1 * | 5/2013 | Bakken | G06F 3/03545 345/173 |

OTHER PUBLICATIONS

Bristow, B.; "Stylusist: Clip-on Stylus Holder for iPad 2"; Aug. 2, 2011; 3 pages.

* cited by examiner

ATTACHING A STYLUS

CROSS REFERENCE TO RELATED APPLICATION

This is a continuation of U.S. application Ser. No. 13/560,803, filed Jul. 27, 2012, which is hereby incorporated by reference.

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on the display. As computer systems have grown in popularity, however, alternate input systems have been developed. For example, stylus input systems provide a natural user interface to computer systems by enabling a specific point on the display screen to be selected or identified when the user physically touches the display with a pen-like device or stylus.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2A is a simplified illustration of the stylus clip and first inductive element, while

FIG. 4A is a top down view of a computing device and stylus holder assembly, while

DETAILED DESCRIPTION OF THE INVENTION

Figure 1:
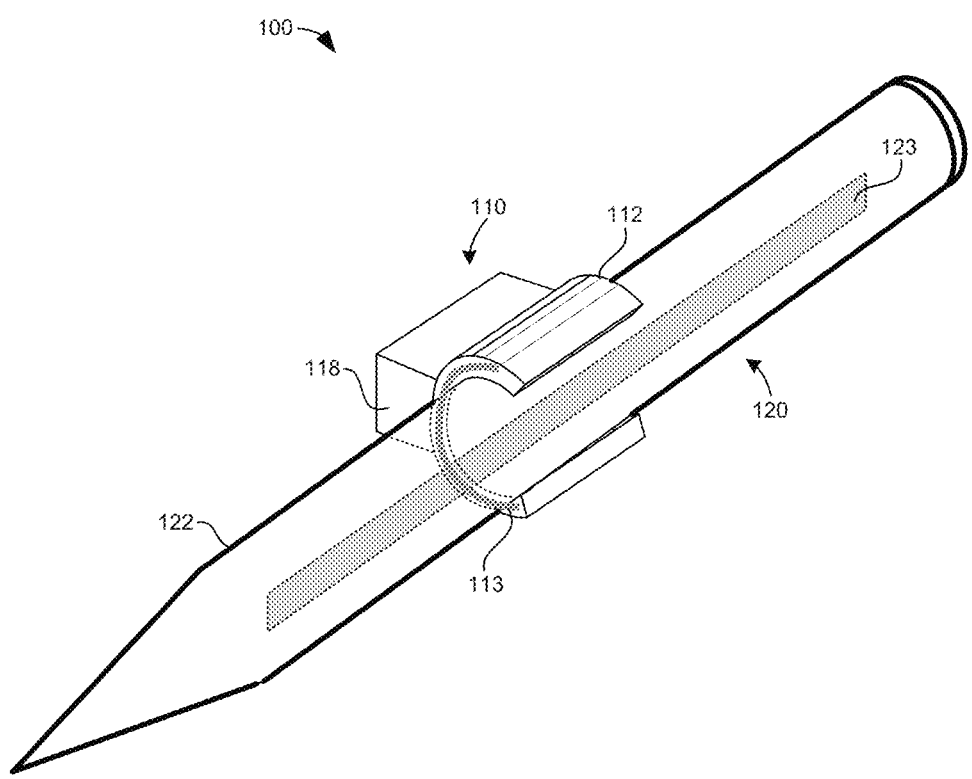
FIG. 1 is a three-dimensional perspective view of a stylus assembly for inductive coupling according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Generally, a stylus falls into two disparate categories: 1) an inexpensive pen-shaped stylus (passive stylus) that lacks electrical components and simply acts as a selection mechanism in the same way as a user's fingers, and 2) a high-tech or active stylus that includes several electrical components for providing additional functionality. The latter category of styli requires battery power, which can make the stylus bulky and heavy. Moreover, the use of stand-alone batteries is often troublesome for the operating user through continuous changing of the batteries while also contributing to environmental waste. Prior solutions include a stylus "garage" formed on the computing device for housing and charging the stylus. However, such designs lead to additional and bulky hardware on the computing device. A tethered stylus is an analog solution which uses a tether and attachment feature for maintaining a physical connection of the stylus with the computing device. However, management of the tether is often burdensome for the user (e.g., wraps around other items) and in the event the user loses the tether attachment feature, the rope and the stylus essentially hang listlessly in the air.

Examples of the present invention disclose a pen stylus and holder device associated therewith for use with a computing device. According to one example, the holder device includes a connecting portion for insertion into a corresponding port on a computing device in addition to a fastening portion for holding the stylus in a fixed position. Furthermore, the stylus includes an inductive element for facilitating inductive coupling with an inductive element formed on the fastening portion of the holder device. As a result, the present example embodiments provide a user-friendly and compact stylus assembly that enables communication and recharging of the stylus with any powered computing device having a corresponding input/output port.

Referring now in more detail to the drawings in which like numerals identify corresponding parts throughout the views, FIG. 1 is a three-dimensional perspective view of a stylus assembly for inductive coupling according to an example of the present invention. As shown here, the stylus assembly 100 includes a stylus 120 and a stylus holder device 110. The holder device 110 includes a fastener 112 and a connector 118 for insertion into a compatible port of a computing device. According to one example, the fastener 112 represents a flexible pen clip, C-clip or similar fastening element configured to hold the stylus 120 in a fixed position when positioned therein. The fastener 112 includes an inductive charging element 113 formed therein (or along an inner surface thereof) representing an inductive coil or similar device configured to generate an electromagnetic field for transferring energy (e.g., low-power charging) with a corresponding inductive element (e.g., inductive element 123). Stylus 120 represents a pen-shaped tool for facilitating user input on a touch-based computing device and includes an outer housing 122 and inner inductive element 123. More specifically, the inductive charging element 123 is formed within the housing 122 and represents an inductive coil or similar device that corresponds with inductive element 113 associated with the stylus holder device 110 for providing low-power inductive charging for example. According to one example, the inductive element 123 of the stylus 120 may be elongated to substantially cover the length of the stylus housing 122 such that the fastener 112 of the holder device 110 may be attached at various positions along the stylus housing 122 and still provide inductive coupling therewith.

Figure 2A:
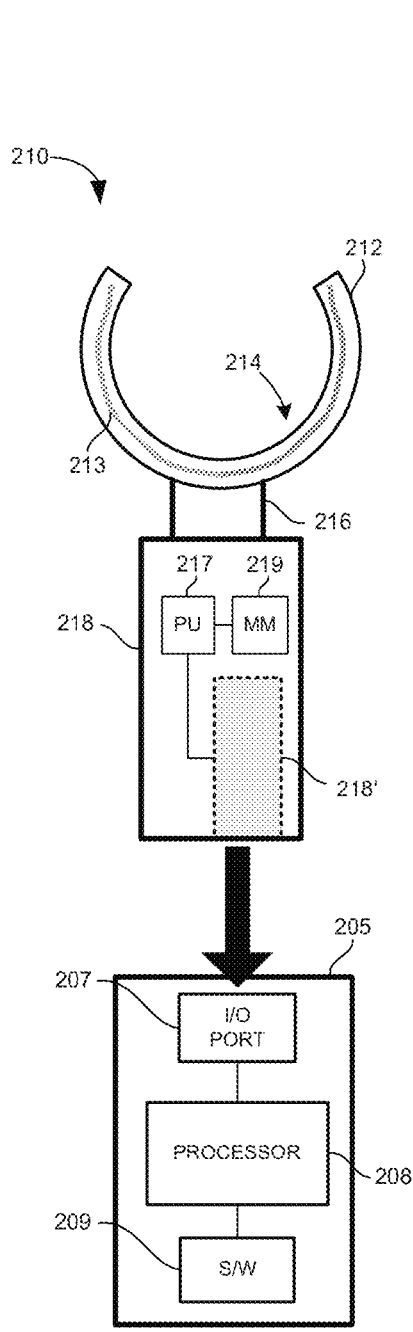
Figure 2B:
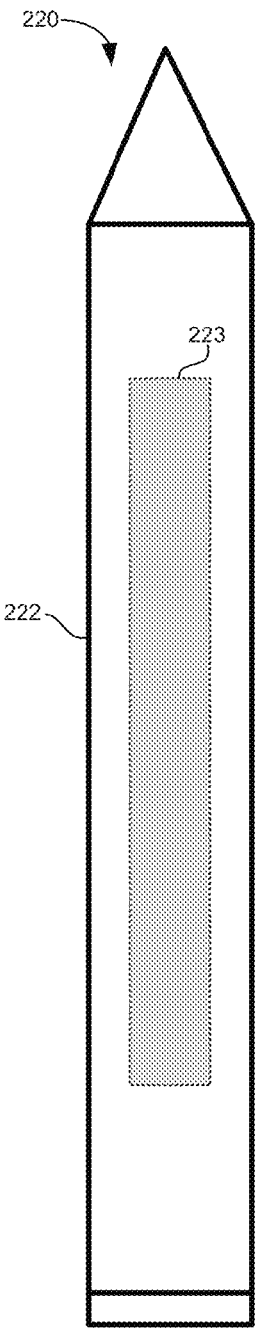
FIG. 2B is a simplified illustration of the stylus and second inductive element according to an example of the present invention.

FIG. 2A is a simplified illustration of the stylus clip and first inductive element, while FIG. 2B is a simplified illustration of the stylus and second inductive element according to an example of the present invention. As shown in FIG. 2A, the stylus holder 210 includes a fastening portion 212 and a joining portion 216 that attaches a connector portion 218 with the fastening portion 212. The fastening portion 212 is configured to hold a pen-shaped stylus and includes an inductive element 213 that corresponds with an inductive element 223 of the stylus 220 of FIG. 2B. The inductive element 213 may be formed along an inner surface 214 of the fastening portion 212, within the fastening portion 212 as shown, or represent the entire fastening portion 212. The connector portion 218 includes a connector plug 218' comprising of electrical contacts configured to engage with corresponding electrical contacts of a port 207 of a computing device 205. According to one example, the connector plug 218' represents a Universal Service Bus (USB) connector plug configured to mate with a corresponding USB port of a computing device. However, the connector plug 218' may be a Micro or Mini USB connector/plug, IEEE 1394 interface connector/plug, or any other communications protocol capable of providing communication and/or power between two connected electronic devices. As a result, when the user clips the stylus 220 into the fastener 212 of the stylus holder 210, the stylus 220 can be inductively charged through power provided by the connected port 207 (e.g., USB) of the computing device 205 via plus 218' of the stylus holder 210. Moreover, the inductive elements 213 223 of the stylus holder 210 and stylus 220 respectively, may include a coil that serves as a wireless antenna for transferring both data (e.g., via near field communication, radio frequency, or similar wireless communication protocol) and power to/from the stylus holder 210.

Still further, the stylus holder 210 may include a memory module 219 for data storage and a processing unit 217 for communicating with software 209 of the computing device 205. In the event the stylus holder 210 is accidently removed from the I/O port 207 of the computing device 205, software 209 running on the computing device 205 can detect the removal and provide a notification to the user. For example, the software 209 may be configured to wake up the computing device from a sleep state, sound an alarm or audible noise, or cause an associated display screen to display a visual warning. Thus, the user is immediately aware of the removal and absence of the stylus holder 210 from a connective state with the computing device 205.

Figure 3A:
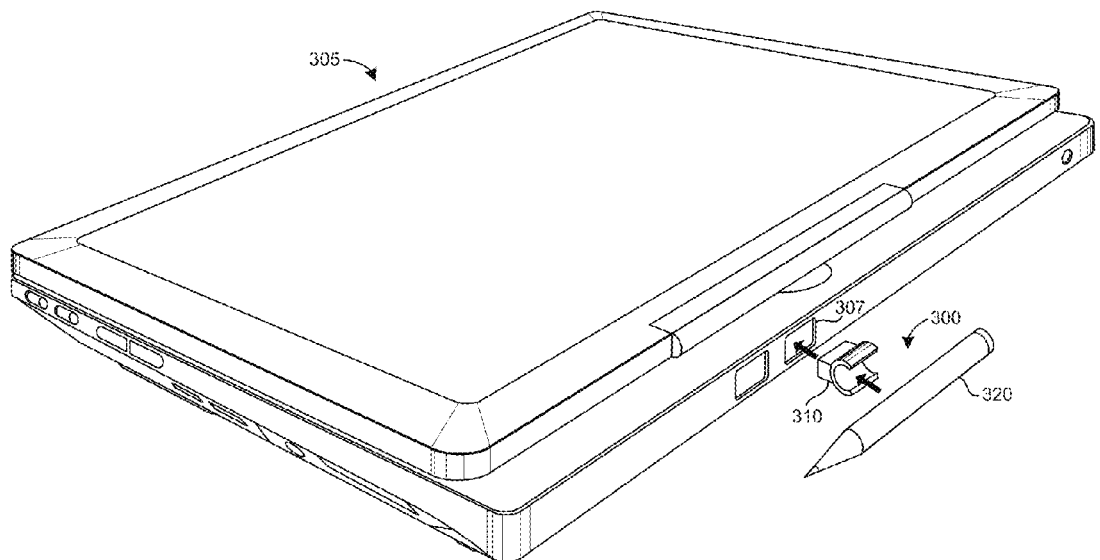
FIGS. 3A and 3B are three-dimensional perspective views of a computing device for use with a stylus and holder device according to an example of the present invention.
Figure 3B:
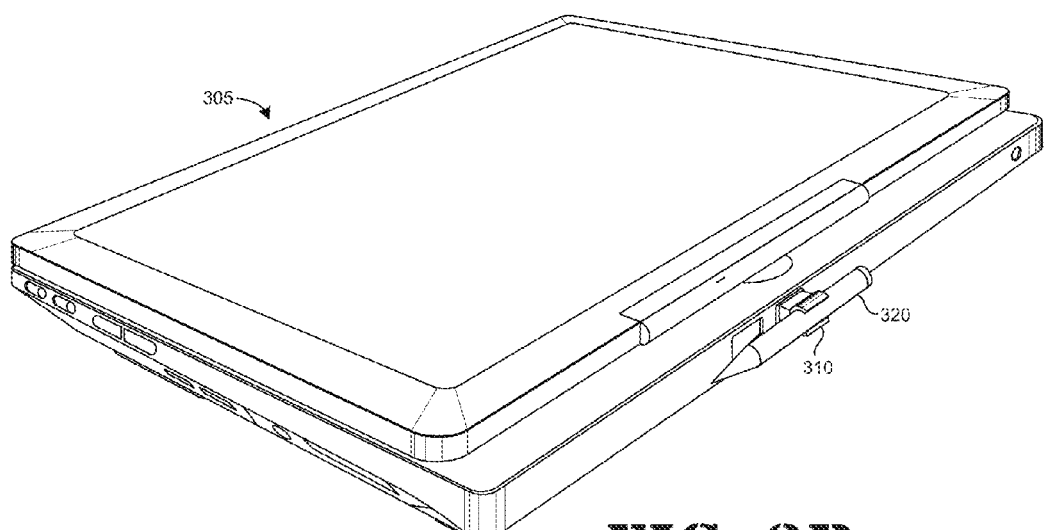

FIGS. 3A and 3B are three-dimensional perspective views of a computing device for use with a stylus and holder device according to an example of the present invention. FIG. 3A depicts a computing device 305 having at least one input/output port 307 such as USB port or similar input interface. As explained above, the stylus clip 310 and connector portion thereof is configured to attach to the port 307 of the computing device 305. The stylus clip 310 is also configured to provide a fastening means for holding the stylus 320 in a fixed position. More particularly, and as indicated by the directional arrows of FIG. 3A, the stylus 320 is inserted into the fasting portion of the stylus clip 310, which is inserted into the port 307 of the computing device 305. FIG. 3B depicts the stylus assembly 300 (stylus clip 310 and stylus 320) in an assembled state in which a portion of the stylus 320 is in physical contact with the fastening portion of the stylus clip 310. For example, the fastener of the stylus clip 310 may formed to be no more than one inch in width so as provide a secure grip on the stylus 320 while still maintaining a compact form factor. When in the assembled or contact state, the stylus 320 and stylus clip 310 are inductively coupled via the inductive coupling elements associated with both stylus 320 and stylus clip 310. As such, electrical communication is established between all devices such that data and/or power may be exchanged between the computing device 305, stylus clip 310, and stylus 320.

Figure 4A:
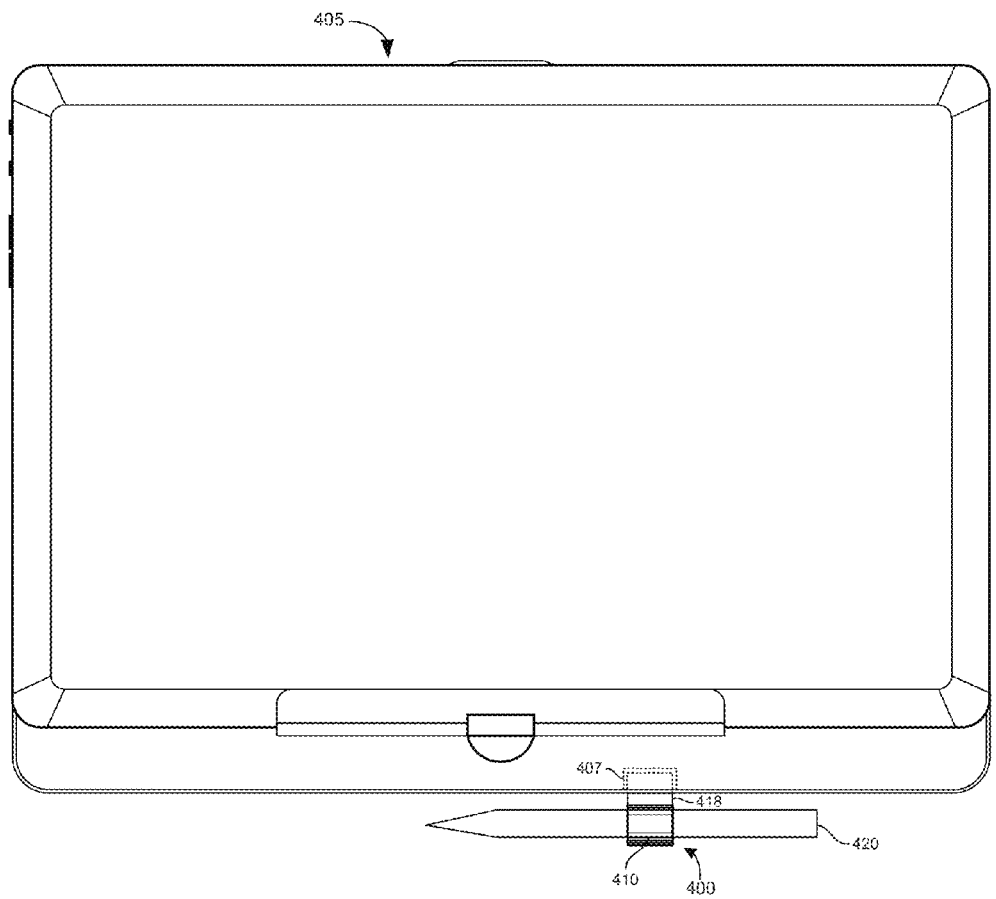
Figure 4B:
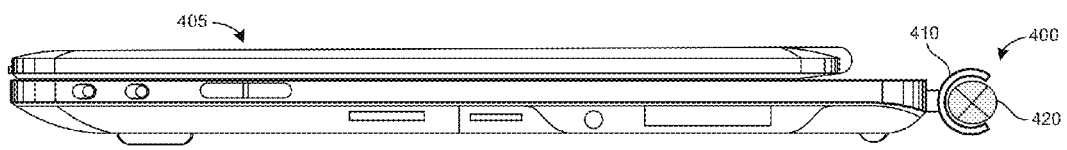
FIG. 4B is a side profile view of the computing device connected with the stylus holder assembly according to an example of the present invention.

FIG. 4A is a top down view of a computing device and stylus holder assembly, while FIG. 4B is a side profile view of the computing device connected with the stylus holder assembly according to an example of the present invention. As shown in FIG. 4A, the stylus assembly 400, which includes the stylus holder 410 and pen-shaped stylus 420, is in an assembled and connected state with the computing device 405. Specifically, the connector portion 418 of the stylus holder 410 is inserted into a port 407 of the computing device 405 for enabling electrical communication between stylus holder 410 and the computing device 405. According to one example, the stylus 420 is positioned within the stylus holder 410 such that the elongated side of the stylus 420 runs parallel with the adjacent side of the computing device 405. Moreover, the stylus holder 410 is shaped to only hold a portion of the stylus 420 rather than encase the entire housing of the stylus as in previous solutions. Referring now to FIG. 4B, the fastening portion of the stylus holder 410 is formed in a C-shape so as to allow easy removal and insertion of the pen stylus 420 from the inner cavity thereof while still providing a secure and reliable grip on the housing surface of the stylus 420.

Embodiments of the present invention provide an inductive stylus assembly for use with a computing device. Moreover, many advantages are afforded by the stylus assembly in accordance with embodiments of the present invention. For instance, the present examples utilize standard features and functionality of existing computing devices to charge and communicate with the pen stylus while also eliminating the use of visible tethers utilized in previous solutions. Furthermore, inductive coupling provides a stress-free charging environment so that users no longer need to carry an additional charging unit or remove/replace batteries when the power of the pen stylus depletes. In addition, embodiments in accordance with examples described above also provide the stylus with a storage location relative to the computing device while simultaneously charging the stylus.

Furthermore, while the invention has been described with respect to exemplary embodiments, one skilled in the art will recognize that numerous modifications are possible. For example, although exemplary embodiments depict a notebook computer as the portable computing device, the invention is not limited thereto. For example, the computing device may be a netbook, a tablet personal computer, a smart phone, or any other computing device having compatible input ports and communicative/powering functionality.

Furthermore, the stylus clip and fastening portion may be formed in any shape that allows for easy insertion and removal of the stylus from the fastening portion rather than the C-shape clip element as depicted and described above. Thus, although the invention has been described with respect to exemplary embodiments, it will be appreciated that the invention is intended to cover all modifications and equivalents within the scope of the following claims.

What is claimed is:

1. A stylus holder comprising:
 a connector to attach to a port of a computing device and create an electrical connection to the computing device port; and
 a fastener to attach a stylus to the holder and provide at least one of a data or power connection to the stylus, wherein the fastener includes a first inductive element formed in an internal cavity area of the fastener, the first inductive element to inductive couple to a second inductive element of the stylus, the second inductive element longer than the first inductive element.

2. The stylus holder of claim 1, wherein the first inductive element is to inductively couple with the second inductive element when the stylus is placed in near physical contact with the fastener.

3. The stylus holder of claim 1, wherein inductive coupling between the first and second inductive elements enables transfer of both data and power between the stylus and the computing device.

4. The stylus holder of claim 1, wherein the fastener is a flexible pen clip.

5. The stylus holder of claim 1, wherein the fastener is a C-clip, and the first inductive element extends along a curved profile of the C-clip.

6. The stylus holder of claim 1, wherein the fastener is shaped to hold only a portion of the stylus.

7. The stylus holder of claim 1, further comprising a processor to communicate with machine-readable instructions executing in the computing device, wherein removal of the stylus holder from the port of the computing device is to cause the machine-readable instructions to provide a notification of the removal.

8. The stylus holder of claim 1, wherein the connector is a Universal Serial Bus (USB) plug for connecting with a USB port of the computing device.

9. A stylus comprising:
 a housing to fasten to a stylus clip that is connected to a port of a computing device; and
 an elongate inductive element within the housing and to inductive couple to an inductive element of the stylus clip that has a fastener to hold the stylus in a fixed position and a connector to connect to the port of the computing device, wherein the elongate inductive element is longer than the inductive element of the stylus clip.

10. The stylus of claim 9, wherein the elongate inductive element in the stylus is to inductively couple with the inductive element of the stylus clip when the stylus is placed in physical contact with the fastener of the stylus clip.

11. The stylus of claim 9, wherein inductive coupling between the elongate inductive element in the stylus and the inductive element of the stylus clip enables transfer of both data and power between the stylus and the computing device.

12. An assembly comprising:
 a stylus comprising a first inductive element; and
 a stylus holder comprising:
  a connector to electrical connect to a port of a computing device; and
  a fastener to hold the stylus in a fixed position when attached to the fastener, wherein the fastener includes a second inductive element formed in an internal cavity area of the fastener, and
 wherein the first inductive element is longer than the second inductive element.

13. The assembly of claim 12, wherein inductive coupling between the first and second inductive elements enables transfer of power from the computing device to the stylus.

14. The assembly of claim 12, wherein inductive coupling between the first and second inductive elements enables transfer of data between the stylus and the computing device.

15. The assembly of claim 12, wherein the fastener is shaped to hold only a portion of the stylus.

16. The assembly of claim 12, wherein the stylus holder includes a processor to communicate with machine-readable instructions executing in the computing device.

17. The assembly of claim 12, wherein the stylus holder includes a memory coupled to the processor.

18. The assembly of claim 12, wherein the connector is a Universal Serial Bus (USB) plug for connecting with a USB port of the computing device.

19. The assembly of claim 12, wherein the fastener is a flexible pen clip.

20. The assembly of claim 12, wherein the fastener is shaped C-clip.

* * * * *